Figure 1:
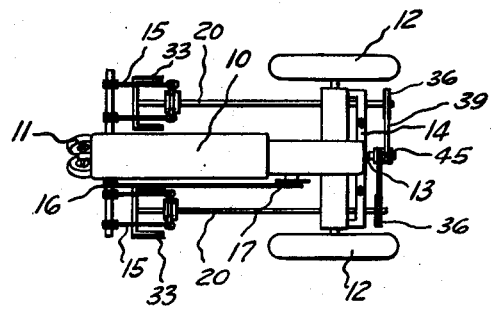

June 16, 1953　　　J. F. PILSNER　　　2,641,981
TRACTOR MOUNTED ROTARY CHOPPER

Filed Feb. 14, 1948　　　　　　　　　　　　2 Sheets—Sheet 1

JOHN F. PILSNER
INVENTOR.

BY *Hastings Ackley*

ATTORNEY

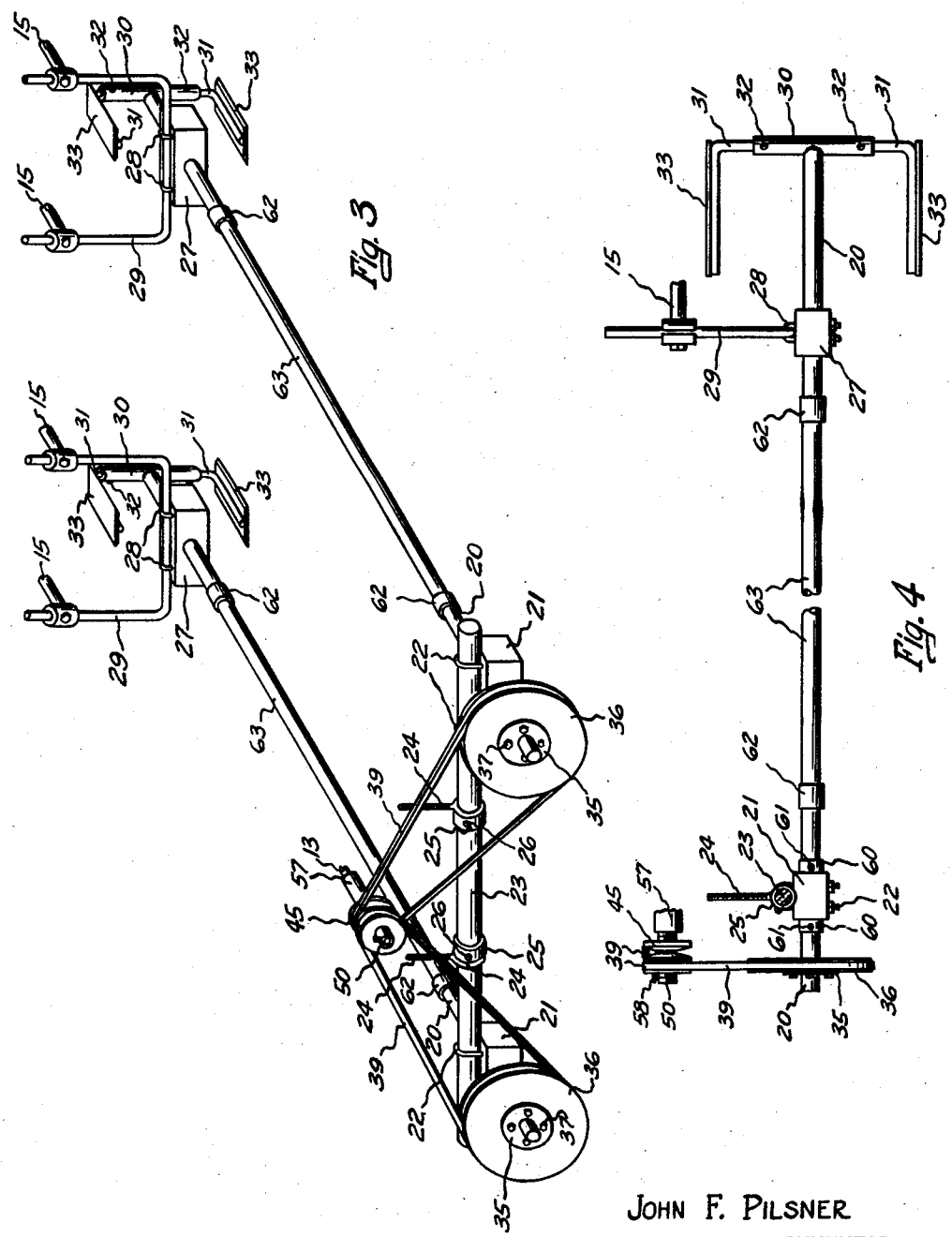
June 16, 1953   J. F. PILSNER   2,641,981
TRACTOR MOUNTED ROTARY CHOPPER
Filed Feb. 14, 1948   2 Sheets-Sheet 2
JOHN F. PILSNER
INVENTOR.
ATTORNEY Patented June 16, 1953

2,641,981

UNITED STATES PATENT OFFICE 2,641,981

TRACTOR MOUNTED ROTARY CHOPPER

John F. Pilsner, Roscoe, Tex.

Application February 14, 1948, Serial No. 8,337

5 Claims. (Cl. 97—15)

This invention relates to new and useful improvements in tractor-mounted chopping devices.

One object of the invention is to provide an improved tractor-mounted power take-off driven mechanical chopper particularly designed for chopping cotton or other similar row plants in order to thin out the rows and leave only the desired number of plants or groups of plants standing in the rows.

An important object of the invention is to provide in a chopping device of the character described a pair of spaced parallel drive shafts having chopping blades mounted on one end thereof, and each independently driven at the other end from the tractor power take-off shaft.

A further object of the invention is to provide a chopping device of the character described having drive shafts of the character described included therein and which is so constructed and arranged that the shafts may be driven at different rates of speed, or may rotate in either direction, or wherein either shaft may be disconnected and rendered inoperative, if desired.

Another object of the invention is to provide a chopping device of the character described wherein the shafts are provided with means for elevating one end of the same, whereby the chopping blades may be rendered inactive at will.

A particular object of the invention is to provide in a chopping device of the character described means for readily changing the speed of rotation of the shafts carrying the cutter blades to meet varying conditions of use, such means being so constructed and arranged that the speed of rotation of either shaft may be altered independently of the other shaft if desired.

A still further object of the invention is to provide a chopping device of the character described wherein the chopping blades are positioned in clear view of the operator of the tractor, whereby the results of use may be observed and the need for adjustment may be readily determined.

A particularly important object of the invention is to provide, in a chopping device of the character described, chopping blade carrying means which is so constructed and arranged that the blades are adjustable in distance radially from the drive shaft to adjust the frequency of the chopping stroke and to accommodate different conditions of use.

Another object of the invention is to provide a chopping device of the character described which may be easily attached and removed from the tractor on which it is used.

Still another object of the invention is to provide a chopping device which is simple in structure and economical to manufacture and use, and which is readily adjustable to fit different types of tractors.

Figure 2:
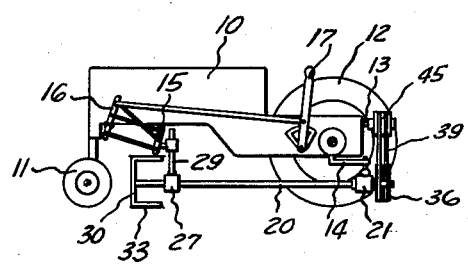
Figures 5, 6:
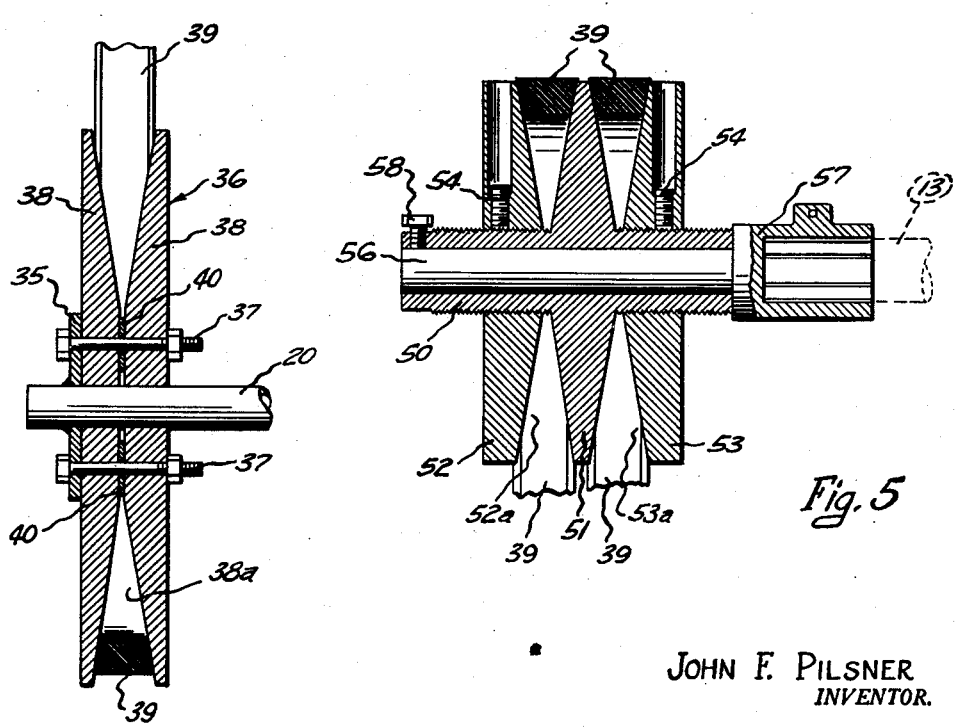

Additional objects and advantages of the invention will readily be apparent from the reading of the following description of a device constructed in accordance with the invention, and reference to the accompanying drawings thereof, wherein:

Figure 1 is a plan view of a tractor having a chopping device constructed in accordance with the invention installed thereon, Figure 2 is a side elevation of the same with a part of the tractor cut away, Figure 3 is an enlarged isometric view of the chopping device, Figure 4 is a longitudinal vertical sectional view taken through the power take-off shaft, with the tractor cut away, Figure 5 is an enlarged cross-sectional view of the adjustable double-sheave drive pulley which is mounted on the power take-off, and Figure 6 is an enlarged cross-sectional view of one of the large adjustable driven pulleys which are mounted on the elongate chopper drive shafts.

In the drawings, the numeral 10 designates generally a tractor having front steerable ground wheels 11 and spaced large rear drive wheels 12. The tractor is also provided with the usual rear power take-off shaft 13 and rear draw bar 14, and has the customary adjustable cultivator or implement beams 15 which may be raised and lowered vertically by means of a bell crank linkage 16 and a lever arm 17 manipulated by the operator of the tractor. The foregoing structure all constitutes a part of the conventional farm tractor, the same being illustrated schematically in the drawings.

The chopping device includes a pair of spaced elongate drive shafts 20 disposed longitudinally of the tractor and positioned on each side thereof inside the rear drive wheels 12. The shafts 20 are each supported at their rear end in a bearing block 21, preferably of hard wood, which blocks are securely fixed or mounted by means of U-bolts 22 on a transverse substantially cylindrical cross member 23. The cross member 23 is adjustably mounted below the draw bar 14 of the tractor by means of eye bolts 24 which are adjustably secured to the draw bar by means of nuts threaded on the said eye bolts. The cross member extends through the eyes of the eye bolts, and is held in proper position with respect to the tractor by means of movable collars 25 which are slidable on the cross member and may be secured in position thereon by set screws 26 to positively restrain the cross member against longitudinal movement with respect to the eye bolts.

The front end of each drive shaft 20 is rotatably mounted in a bearing block 27, preferably of hard wood, and each bearing block 27 is swingably secured by means of U-bolts 28 to the lower horizontal cross portion of a U-shaped hanger or support 29 which has its upright arm adjustably secured by set screws to the implement beams 15 of the tractor.

Substantially T-shaped chopper heads 30 are mounted on the forward end of each shaft 20, and the cross piece of each chopper head is preferably tubular, whereby one arm of an L-shaped chopper blade carrier 31 may be inserted in each tubular arm of the chopper head cross-piece, and may be adjustably secured in place therein by means of set screws 32. Each L-shaped chopper blade carrier has welded or otherwise secured thereto a flat elongate substantially rectangular chopper blade 33, and the blade carriers and chopper blades are so positioned that the blades and the arms of the carriers on which the blades are mounted extend rearwardly from the chopper head cross-piece with the longitudinal axis of the chopper blades parallel to the drive shaft. The longitudinal edges on each side of the chopper blades are sharpened to provide for chopping vegetation as the shaft is rotated to rotate the chopper head and swing the blade carriers 31. The distance which the chopper blades 33 are spaced radially from the rotatable drive shaft 20 may be varied by adjusting the position of the carrier members 31 in each arm of the chopper head 30.

A circular flat disc or hub 35 is welded or otherwise affixed to the rear end of each drive shaft 20 and is constructed and arranged to have large driven pulleys 36 secured thereto by means of bolts 37, as best shown in Figure 3. Each of the pulleys 36 is formed of two circular flat disc-like members 38 having their adjacent peripheral edges beveled or inclined inwardly to form a groove 38a between said disc members for receiving a V-belt 39. By providing spacer washers 40 between each of the disc sections 38 of the pulley, the spacing between the disc sections may be varied to vary the effective diameter of the belt groove 38a of the large driven pulley 36, whereby the radius at which the V-belt 39 will be gripped between the disc sections may be varied. In this manner the speed of rotation of the driven pulley 36 may be altered. The washers are mounted on the bolts 37 extending through each of the disc sections 38 of the pulley.

For driving the V-belt 39, in order to drive the large driven pulleys 36 and rotate the drive shafts 20, a variable pitch double-sheave pulley 45 is provided. The double-sheave pulley is mounted on the rear power take-off shaft 13 of the tractor and is so positioned that the V-belt from one of the driven pulleys 36 is mounted in one of the belt grooves of the double-sheave pulley and the V-belt from the other driven pulley 36 is mounted in the other belt groove of said pulley, whereby said double-sheave pulley is driven by the power take-off shaft and in turn drives the large driven pulleys 36 by means of the V-belts 39 to cause rotation of the drive shafts 20. Rotation of the drive shafts swings the cutter blades 33 about the forward end of the shaft to cause said cutter blades to cut or chop vegetation.

The double-sheave pulley 45 includes a hollow shaft 50 having an integral or fixed radially extending circular disc 51 mounted centrally thereon. A movable disc 52 is screw-threaded onto the hollow shaft 50 on one side of the fixed disc 51, and a similar movable disc 53 is screw-threaded onto the hollow shaft on the opposite side of said fixed disc. The movable discs 52 and 53 and the fixed disc 51 have their adjacent sides diverging outwardly, whereby a V-shaped annular space or belt groove 52a is provided between the movable disc 52 and the fixed disc 51, and a similar V-shaped belt groove 53a is provided between the fixed disc 51 and the movable disc 53. By rotating the discs 52 and 53 on the screw-threaded hollow shaft 50, said discs may be moved toward or away from the central stationary disc 51 to widen or narrow the V-shaped annular belt grooves or spaces therebetween, whereby the effective diameter of the drive pulley belt grooves may be varied. The movable discs 52 and 53 are secured in adjusted positions on the hollow shaft 50 by means of set screws 54 which are threaded in radial openings formed in said discs and engage the hollow shaft to prevent further rotative movement of the discs on said shaft. The hollow shaft 50 is removably mounted on a solid stub shaft or mandrel 56 projecting axially outwardly from one end of a sleeve 57 which is adapted to fit and be secured on the power take-off drive shaft 13 of the tractor. A set screw 58 is threaded through the wall of the hollow shaft 50 and engages the mandrel 56 to secure the hollow shaft in place on the mandrel, whereby the sheave discs 51, 52 and 53 may be rotated by the tractor power take-off drive shaft 13 to drive the V-belts 39 and rotate the driven pulleys 36 and the drive shafts 20 connected therewith.

A pair of stop collars 60 are mounted on the drive shafts 20 on each side of the rear bearing blocks 21, and are secured in place thereon by set screws 61 for limiting longitudinal movement of the drive shaft with respect to the bearing blocks and correctly aligning and positioning the large driven pulleys 36 with respect to the small double-sheave pulley 45, whereby the V-belts 39 may be properly mounted in the belt grooves of said double-sheave pulley 45 and large driven pulleys 36.

Likewise, the lateral position of the bearing blocks 21 on the cross-member 23 may be predetermined and fixed by tightening the U-bolts 22 to secure the blocks on the cross-member at the desired lateral position.

In order to accommodate different tractor lengths or sizes, each of the drive shafts 20 is preferably formed of sections of tubular metal or pipe which are joined by couplings 62, whereby the length of the shaft may be controlled by selecting and connecting a central section 63 of proper length in the drive shaft.

The forward ends of the drive shafts 20 and the cutter blades carried thereby may be moved to an inoperative position by lifting the implement cross beam 15 by means of the lever 17 and linkage 16 in the customary manner. Thus, the cutter blades 33 may be lifted out of operative position, or may be lowered into operative position, or the cutter blades may be adjusted in height to accommodate different conditions of use, as desired.

Likewise, the length of the eye bolts 24, by means of which the cross-member 23 is secured to the draw bar 14 of the tractor, is such that the height of the rear end of the shafts 20 may be adjusted to set and maintain said shafts in the proper horizontal position when the shafts are in operative position. The threaded eye-bolts also provide for the adjustment or tightening of the V-belts which turn the drive shafts.

The eye bolts 24 permit the cross-member 23 to rotate in the eye portion of said bolts when the forward ends of the drive shafts 20 are lifted.

Similarly the U-bolts 28 by means of which the front bearing blocks 27 are connected to the U-shaped hanger member 29 permit the bearing blocks to rotate on the horizontal bottom cross section of said U-shaped hanger member.

In use, the U-shaped hanger members 29 are adjusted to the proper height to permit the cutter blades 33 carried by the chopper head 30 to strike the ground in the proper position to chop the cotton plants or other row crops. The small double-sheave pulley 45 and the large driven pulleys 35 at the rear of the chopping device are then adjusted to provide the proper belt groove sizes to give the proper speed of rotation to the elongate drive shafts 20 for the particular tractor power take-off shaft speed. The tractor is then put into motion and the power take-off shaft started to rotating, whereupon the chopper heads 30 are rotated and the chopper blades 33 are swung to cut or chop out portions of the rows of plants. When the end of the rows has been reached, the implement cross beam 15 is elevated to lift the chopper blade 33 out of operative position and permit the tractor to be turned and started along a new pair of rows of cotton or other row crops.

The radial spacing of the chopper blades from the drive shaft 20 may be varied by adjusting the L-shaped carried arms 31 in the chopper head 30, whereby the circular travel of the chopper blade is varied to vary the interval between chopping strokes at any given speed of rotation of the drive shafts 20. It is particularly important to note that the speed of rotation of the chopper heads and the chopper blades may be further controlled by adjusting the belt groove diameters of the small double adjustable sheave pulley 45 and the large adjustable driven pulleys 36.

From the foregoing, it will be seen that an improved chopping device has been provided which is adapted to be mounted on a tractor and driven by the power take-off shaft of the tractor, that the speed of rotation of the drive shafts of said chopping device may be varied by varying the effective pulley sheave diameters of the adjustable small double-sheave drive pulley and the large adjustable driven pulleys on each of the shafts. Furthermore, the radial spacing of the chopper blades with respect to the drive shafts may be varied, to vary the arc of travel through which the chopper blades must turn, to further vary the chopping interval. It will also be seen that the drive shafts of the chopping device are each independently driven from the double-sheave adjustable drive pulley, whereby each of the shafts may be driven at different rates of speed or may be rotated in different directions. Likewise, the chopper blades of the chopping device may be elevated out of operative position, or lowered into operative position, and adjusted in operating position, as desired.

It will also be seen that the chopping device is simple and economical to construct, and may be readily and easily installed on or attached to and removed from the tractor on which it is used. Manifestly, the chopping device may be adjusted to accommodate different conditions of use, whereby different row crops may be cultivated by means of its chopping blades, and different intervals of chopping provided for. Furthermore, it is readily manifest that the chopping device is easily adjustable, whereby it may be fitted to and mounted on various types of tractors so as to be substantially universal in its application to said tractors.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A chopping device adapted to be mounted on and operated by means of a tractor having a forward vertically adjustable implement beam, a rear draw bar and a rear power take-off shaft and including, a pair of elongate spaced drive shafts, means for adjustably connecting the rear portion of the drive shafts with the rear draw bar of the tractor, means for adjustably connecting the forward portion of the drive shafts with the vertically adjustable implement beam of the tractor, cutter means carried by the front end of each drive shaft and spaced radially therefrom and swingable in a circle about the longitudinal axis of the drive shaft as said shaft is rotated, a pulley at the rear end of each drive shaft, an adjustable double sheave pulley connected with the power take-off shaft of the tractor, an endless flexible belt mounted in the sheave of each drive shaft pulley and extending from said drive shaft pulley to one of the adjustable sheaves of the double sheave pulley whereby the drive shafts are rotated and driven by the tractor power take-off shaft, the adjustable double sheave pulley providing for changes in diameter of the belt groove of each of the sheaves of said double sheave pulley whereby the speed of rotation of each of the drive shafts may be controlled independently of the other.

2. A chopping device of the character set forth in claim 1 wherein, the elongate spaced drive shafts are each formed of a plurality of sections, whereby the lengths of said shafts may be adjusted.

3. A chopping device of the character set forth in claim 1 wherein, the connection between the forward end of each drive shaft and the implement beam of the tractor is adjustable vertically to permit adjustments in height of the front end of the drive shafts, said vertically movable implement beam also providing means for elevating and lowering the front ends of the drive shafts carrying the cutter means to adjust the cutter means into and out of operative position.

4. A chopping device of the character set forth in claim 1 wherein, the pulley at the rear end of each drive shaft is adjustable to provide various belt groove diameters.

5. A chopping device of the character set forth in claim 1 wherein, the connection between the cutter means and each drive shaft is adjustable, whereby the radial spacing of the cutter means from the drive shaft may be varied to meet varying conditions of use.

JOHN F. PILSNER.

References Cited in the file of this patent

UNITED STATES PATENTS

| Number | Name | Date |
|---|---|---|
| 407,512 | Clark | July 23, 1889 |
| 1,776,830 | Chenault | Sept. 30, 1930 |
| 1,828,615 | Pearce | Oct. 20, 1931 |
| 2,182,157 | McDermott | Dec. 5, 1939 |
| 2,254,380 | Mitchell | Sept. 2, 1941 |